United States Patent [19]

Cook

[11] Patent Number: 5,140,311
[45] Date of Patent: Aug. 18, 1992

[54] PUMP SHUT-DOWN SYSTEM

[75] Inventor: Farley Cook, Levelland, Tex.

[73] Assignee: Chevron Research and Technology Company, San Francisco, Calif.

[21] Appl. No.: 641,841

[22] Filed: Jan. 16, 1991

[51] Int. Cl.$^5$ ............................................. G08B 21/00
[52] U.S. Cl. ..................................... 340/682; 340/686; 361/23; 417/44; 417/63
[58] Field of Search .................. 340/682, 686; 361/23; 417/63, 44; 384/448

[56] References Cited

U.S. PATENT DOCUMENTS

| | | | |
|---|---|---|---|
| 3,853,087 | 12/1974 | Aldag | 340/682 |
| 4,063,786 | 12/1977 | Rall | 384/448 |
| 4,296,629 | 10/1981 | Vuyovich | 340/686 |
| 4,320,431 | 3/1982 | Bell | 361/23 |
| 4,379,291 | 4/1983 | Hubbard et al. | 340/686 |
| 4,434,448 | 2/1984 | Bell | 361/23 |

Primary Examiner—Glen R. Swann, III
Attorney, Agent, or Firm—E. J. Keeling; E. A. Schaal

[57] ABSTRACT

A pump shut-down system is disclosed for preventing damage to the pump from bearing failure. That system has a metal bar located within a preset clearance distance from a traveling element of the pump (such as a piston rod), a voltage source in electrical contact with the metal bar, an automatic shut-down relay in electrical contact with the voltage source, and an electrical ground on the pump in electrical contact with the voltage source. The metal bar, voltage source, automatic shut-down relay, and electrical ground all form an electrical circuit. That circuit is open when the metal bar is not in physical contact with the traveling element, and is closed whenever the metal bar is in physical contact with the traveling element. Whenever the circuit is closed, the automatic shut-down relay shuts down the pump.

7 Claims, 1 Drawing Sheet

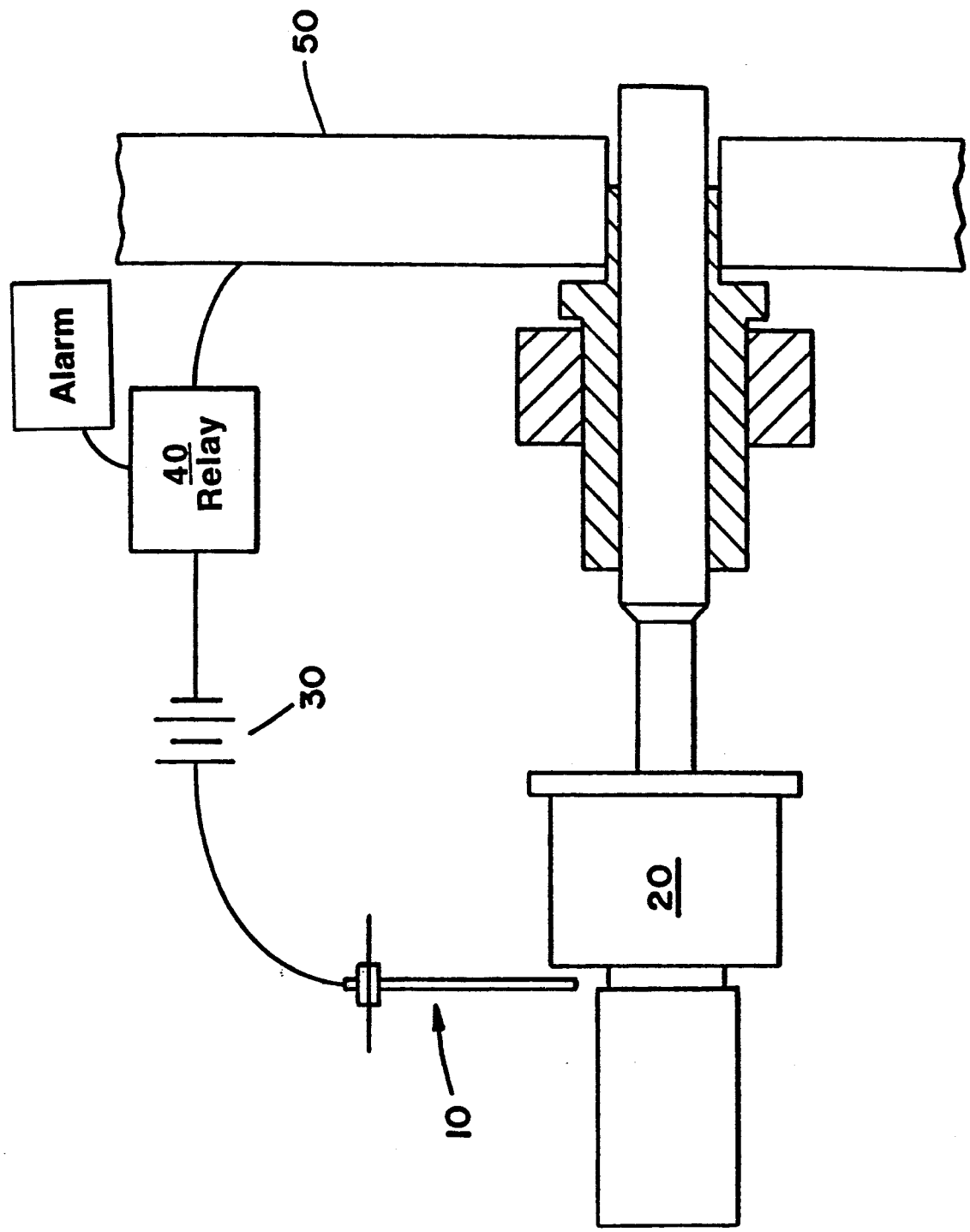

PUMP SHUT-DOWN SYSTEM

PUMP SHUT-DOWN SYSTEM

The present invention relates to a pump shut-down system for preventing bearing-failure damage to a pump that operates in a dry environment.

BACKGROUND OF THE INVENTION

A common problem in pumps is bearing failure due to wear and fatigue on those bearings. If not caught in time, crankshaft or rod bearing failure could cause major damage to the pump. On the other hand, if caught in time, bearing failure can be prevented from minor maintenance.

SUMMARY OF THE INVENTION

The present invention is a pump shut-down system that prevents bearing-failure damage to a pump that operates in a dry environment. For instance, it can be used for a $CO_2$ plunger pump to prevent damage to the pump power end assembly.

The system has an electrical circuit formed by a metal bar, a voltage source, an automatic shut-down relay, and an electrical ground on the pump. The metal bar is placed within a preset clearance distance from a traveling element of the pump (such as a piston rod). When the metal bar is in physical contact with the traveling element, the circuit is closed and the automatic shut-down relay shuts down the pump and activates an alarm device.

The preset clearance distance is about 0.050 inches. When the bearings of the pump are sleeve bearings, the preset clearance distance is preferably less than the skin depth of those sleeve bearings. The metal bar can be located within a preset clearance distance from the top of the traveling element or from an end of the stroke of the traveling element.

BRIEF DESCRIPTION OF THE DRAWINGS

To assist the understanding of this invention, reference will now be made to the appended drawings. The drawings are exemplary only, and should not be construed as limiting the invention.

FIG. 1 shows a schematic drawing of one embodiment of the present invention.

DETAILED DESCRIPTION OF THE INVENTION

In its broadest aspect, the present invention involves a shut-down system for a pump that operates in a dry environment. It uses an electrical circuit formed by a metal bar, a voltage source, an automatic shut-down relay, and an electrical ground on the pump. The automatic shut-down relay shuts down the pump when the circuit is closed by the metal bar being in physical contact with a traveling element of the pump.

The present invention will operate only in a dry environment, such as $CO_2$. Presently, it does not work on water injection pumps, since the water shorts out the electrical circuit. By "dry environment," we mean an environment that does not have enough moisture to short out an electrical circuit in normal operation.

There are four elements of the electrical circuit in the present invention: a metal bar, a voltage source, an automatic shut-down relay, and an electrical ground on the pump. The first element, the metal bar, is located within a preset clearance distance from a traveling element of the pump. By "traveling element," we mean an element of the pump that moves back and forth in a predetermined route. For instance, the traveling element could be a piston rod.

The metal bar can be located within a preset clearance distance from the top of the traveling element or it can be located within a preset clearance distance from an end of the stroke of the traveling element. Or, more than one metal can be used, with one metal bar located above the traveling element and the other metal bar located near an end of the stroke of the traveling element.

In one embodiment, the bearings of the pump are sleeve bearings, and the preset clearance distance is less than the skin depth of those sleeve bearings. Preferably, the preset clearance distance is approximately 0.050 inches.

The second element of the electrical circuit, the voltage source, is in electrical contact with the metal bar. By "voltage source," we mean a source of direct current electrical voltage for the electrical circuit. For example, the voltage source can be a battery or an AC/DC transformer. By "in electrical contact," we mean that two items are contacted such that an electrical current can pass from one item to the other. No physical contact is needed.

The third element of the electrical circuit, the automatic shut-down relay, is in electrical contact with the voltage source. By "automatic shut-down relay," we mean an electromagnetic device for automatic control that is actuated by variation in conditions of an electrical circuit and that operates in turn other devices that cause a pump to be shut down. The automatic shut-down relay shuts down the pump whenever the circuit is closed.

The fourth element of the electrical circuit, the electrical ground on the pump, is in electrical contact with the voltage source. Together, those four elements form a closed circuit when the metal bar is in physical contact with the traveling element of the pump.

If desired, the system can have an alarm device that is activated by the automatic shut-down relay whenever the automatic shut-down relay shuts down the pump.

Referring to FIG. 1, metal bar 10 is placed within a preset clearance distance from an end of the stroke of plunger 20. In electrical contact with the metal bar 10 is a DC voltage source 30, an automatic shut-down relay 40, and an electrical ground on the pump 50. When the bearings around the plunger 20 wear sufficiently to cause the plunger to come into physical contact with metal bar 10, automatic shut-down relay 40 shuts down the pump.

While the present invention has been described with reference to specific embodiments, this application is intended to cover those various changes and substitutions that may be made by those skilled in the art without departing from the spirit and scope of the appended claims.

What is claimed is:

1. A pump shut-down system for preventing damage to a pump that operates in a dry environment from bearing failure, said system comprising:
   (a) a metal bar located within a preset clearance distance from a traveling element of said pump;
   (b) a voltage source in electrical contact with said metal bar;

(c) an automatic shut-down relay in electrical contact with said voltage source; and (d) an electrical ground on said pump in electrical contact with said relay;

wherein said metal bar, voltage source, automatic shut-down relay, and electrical ground form an electrical circuit; wherein said circuit is open when said metal bar is not in physical contact with said traveling element, and is closed whenever said metal bar is in physical contact with said traveling element; and wherein said automatic shut-down relay shuts down said pump whenever said circuit is closed.

2. The pump shut-down system according to claim 1 wherein the bearings of said pump are sleeve bearings, and the preset clearance distance is less than the skin depth of those sleeve bearings.

3. The pump shut-down system according to claim 1 wherein said preset clearance distance is approximately 0.050 inches.

4. The pump shut-down system according to claim 1 wherein said traveling element is a piston rod.

5. The pump shut-down system according to claim 1 wherein said metal bar is located with a preset clearance distance from the top of said traveling element.

6. The pump shut-down system according to claim 1 wherein said metal bar is located within a preset clearance distance from an end of the stroke of said traveling element.

7. The pump shut-down system according to claim 1 further comprising an alarm device that is activated by said automatic shut-down relay whenever said automatic shut-down relay shuts down said pump.

* * * * *